United States Patent [19]

Sorensen

[11] 4,373,339
[45] Feb. 15, 1983

[54] THERMAL ENERGY CONVERSION SYSTEM AND METHOD UTILIZING UNENCASED EXPANDITES

[75] Inventor: Jens O. Sorensen, Rancho Santa Fe, Calif.

[73] Assignee: Trade Finance International, Georgetown, Cayman Islands

[21] Appl. No.: 103,573

[22] Filed: Dec. 14, 1979

Related U.S. Application Data

[63] Continuation-in-part of Ser. No. 25,800, Apr. 2, 1979, Pat. No. 4,214,449.

[51] Int. Cl.³ .............................................. F01K 25/06
[52] U.S. Cl. ...................................... 60/649; 60/641.7
[58] Field of Search ................. 60/649, 673, 641.6, 60/641.7, 325, 327, 398, 530, 531

[56] References Cited

U.S. PATENT DOCUMENTS

| | | | |
|---|---|---|---|
| 3,894,393 | 7/1975 | Carlson | 60/641 |
| 3,938,335 | 2/1976 | Marwick | 60/649 X |
| 3,945,218 | 3/1976 | Parker | 60/641 X |
| 4,022,024 | 5/1977 | Abeles | 60/641 |
| 4,030,303 | 6/1977 | Kraus et al. | 60/325 X |
| 4,041,710 | 8/1977 | Kraus et al. | 60/673 |
| 4,079,590 | 3/1978 | Sheinbaum | 60/641 |
| 4,094,356 | 6/1978 | Ash et al. | 60/641 X |
| 4,095,429 | 6/1978 | Morey | 60/641 X |
| 4,106,295 | 8/1978 | Wood | 60/649 |
| 4,132,077 | 1/1979 | Johnson | 60/649 |
| 4,143,516 | 3/1979 | Long | 60/649 |
| 4,149,385 | 4/1979 | Sheinbaum | 60/649 X |
| 4,157,014 | 6/1979 | Clark, Jr. | 60/641 X |
| 4,167,099 | 9/1979 | Wahl et al. | 60/641 |
| 4,180,980 | 1/1980 | Marks et al. | 60/398 |

FOREIGN PATENT DOCUMENTS

| | | | |
|---|---|---|---|
| 73279 | 7/1916 | Austria | 60/398 |
| 52-56242 | 5/1977 | Japan | 60/649 |

*Primary Examiner*—Allen M. Ostrager
*Assistant Examiner*—Stephen F. Husar
*Attorney, Agent, or Firm*—Brown & Martin

[57] ABSTRACT

A system and method of thermal energy conversion is disclosed. The method includes the steps of (a) providing a mass of unencased fluid expandite in a mass transport conduit circuit at a first combination of temperature and pressure; (b) introducing a thermal fluid into the mass transport conduit circuit from a source external to the mass transport conduit circuit at a second combination of temperature and pressure; (c) combining the provided expandite mass with the introduced thermal fluid in a given conduit of the circuit to create an expandite-fluid mixture having a density at some place in the given conduit that is changed from the average proportional density of the expandite mass and the thermal fluid at their respective prevailing combinations of temperature and pressure prior to such combination with each other to create a pressure differential that enhances the flow of the fluids contained within the circuit; (d) directing at least a portion of the fluids contained within the circuit to flow vertically through a given portion of the conduit circuit to create a pressure differential in the given portion of the circuit in relation to the remainder of the conduit circuit to thereby enhance the flow of the fluids contained with the conduit circuit, and (e) converting the pressure of at least a part of the enhanced flow of the contained fluids through the conduit circuit into a useful form of energy. Step (a) includes the steps of: (f) separating from the expandite-fluid mixture, an expandite base which comprises at least a portion of the expandite mass; and (f') thermally conditioning the expandite base.

76 Claims, 14 Drawing Figures

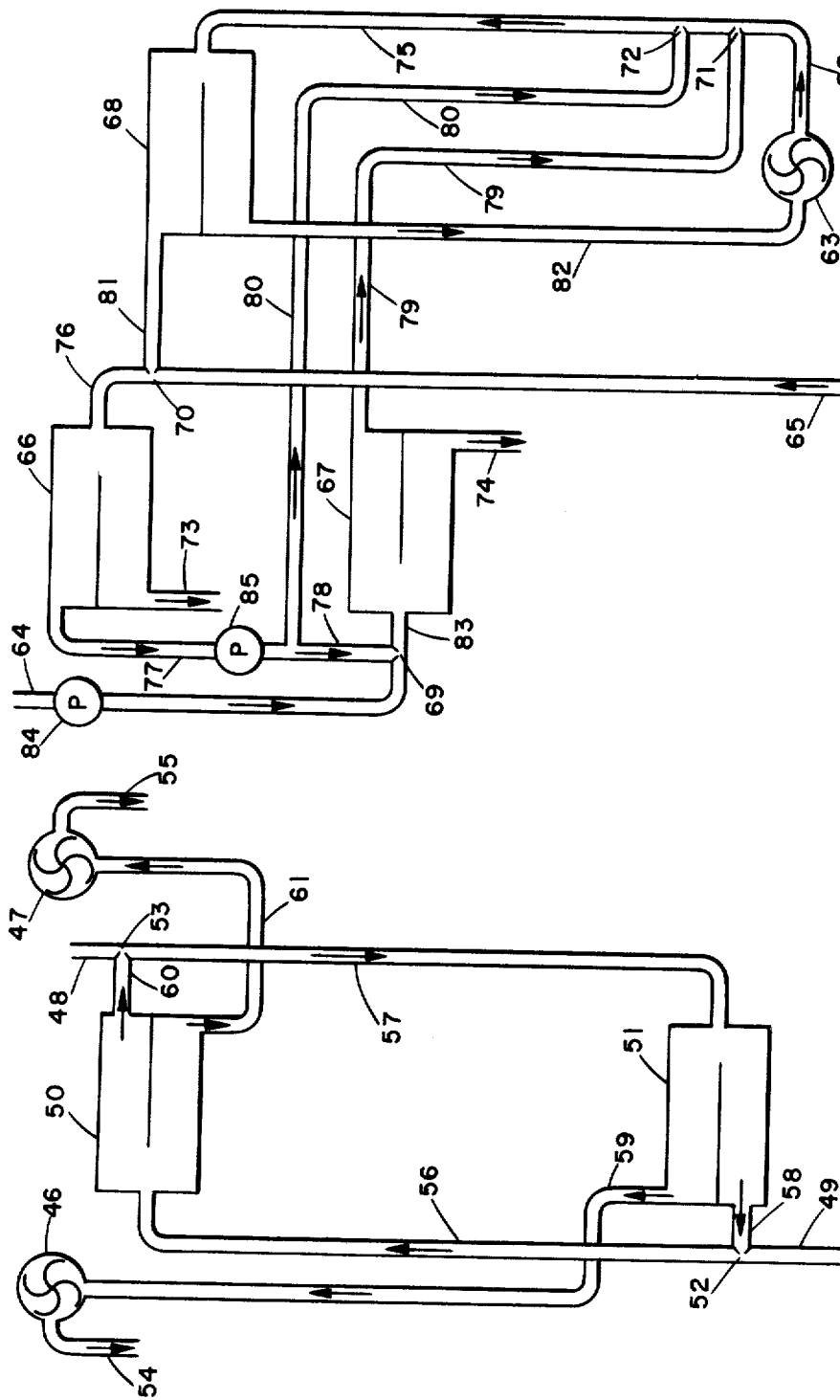

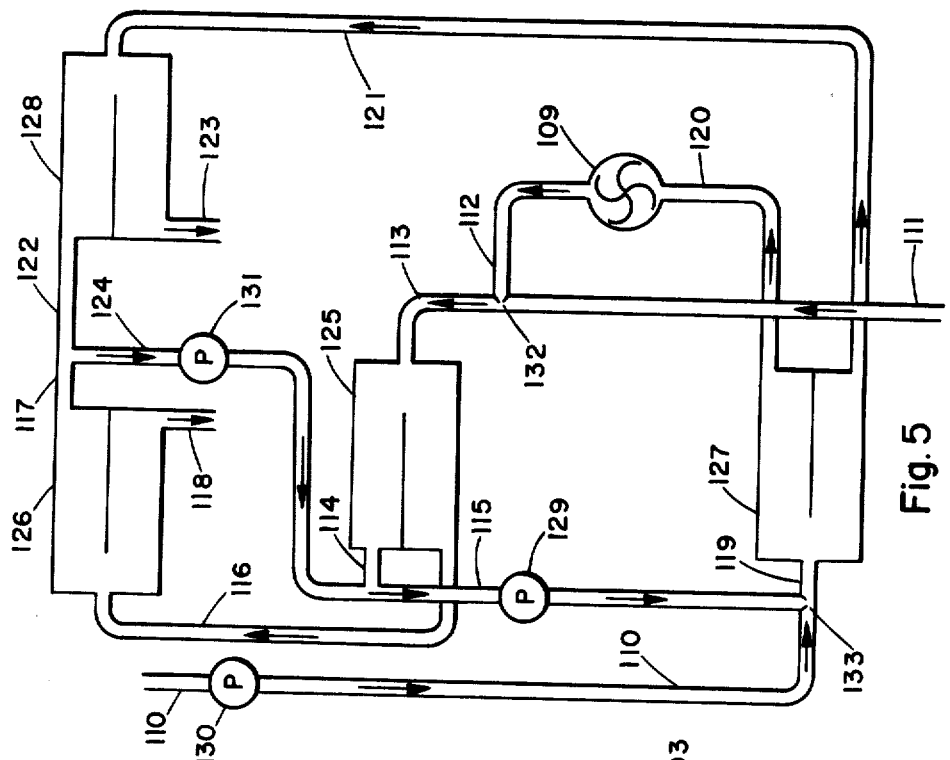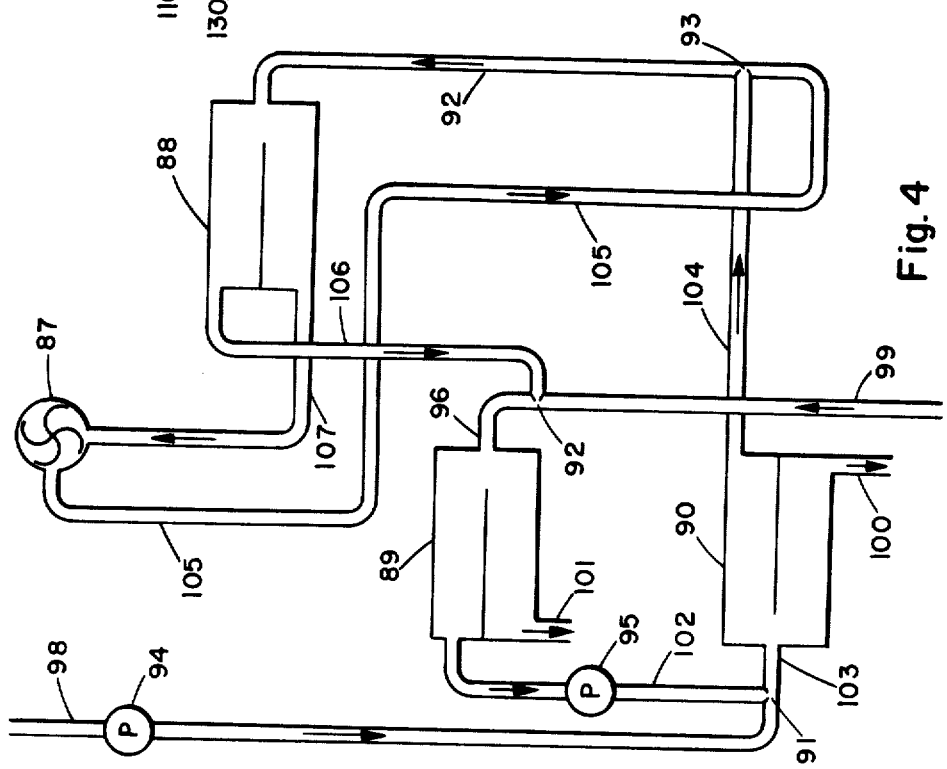

THERMAL ENERGY CONVERSION SYSTEM AND METHOD UTILIZING UNENCASED EXPANDITES

CROSS-REFERENCE TO RELATED APPLICATION

This application is a continuation-in-part application of co-pending application Ser. No. 25,800 filed Apr. 2, 1979 by the present inventor for "Thermal Energy Conversion System Utilizing Expandites," now U.S. Pat. No. 4,214,449.

BACKGROUND OF THE INVENTION

The present invention generally pertains to thermal energy conversion systems and is particularly directed to an improvement in ocean thermal energy conversion systems.

In typical closed cycle ocean thermal energy conversion systems warm surface water is used to heat a working fluid with a low boiling point. Ammonia is a typical working fluid. The fluid is heated in a boiler. Vapor is then cooled by frigid water that is drawn up from deep in the ocean. The vapor condenses, and is pressurized and returned to the boiler; and the cycle is repeated.

Heretofore, it has been believed that ocean thermal energy conversion systems must be deployed in at least sub-tropical waters in order to obtain a large enough temperature differential within the ocean to provide a system that is sufficiently efficient to warrant commercial development.

Another concern with close-cycle ocean thermal energy conversion systems is the cost of heat exchangers that typically are used to transfers heat to the working fluid.

A concern with typical open cycle ocean thermal energy conversion systems is a requirement for bulky tanks having heavy walls so as to enable the sea water to be evaporated at a low pressure in relation to ambient or atmospheric pressure.

SUMMARY OF THE INVENTION

The present invention is a thermal energy conversion system and method for converting a relatively low temperature differential in fluids into a high pressure differential at a minimum of capital investment, cost and maintenance.

Although the present invention is particularly directed to an ocean thermal energy conversion system and method, it also is applicable to other types of thermal energy conversion systems and methods including those in which the surrounding fluid is other than water. The term "fluid" as used herein not only includes a gas or a liquid but also includes a slurry, a mist, a slush, bubbles, a foam and a suspension of solid particles within a gas or liquid.

The patent application of the present inventor cross-referenced herein is directed to a thermal energy conversion system which includes a mass of expandites that change density in response to changes in temperature at a given pressure to thereby change buoyancy with respect to a surrounding thermal fluid; a mass transport conduit circuit for introducing the expandites to a surrounding thermal fluid at different combinations of temperature and pressure and directing the expandites and surrounding thermal fluid in response to pressure differentials created by density changes and concomitant buoyancy changes of the expandites as the expandites are exposed to the surrounding thermal fluid at different combinations of pressure and temperature; and a transducer for converting the pressure of fluid transported by the circuit to a useful form of energy. Expandites are defined as substances that expand or contract when heated or cooled, thereby changing their density. Some expandites expand upon being heated, while others expand upon being cooled.

In the specific preferred embodiments described in such cross-referenced patent application, the expandites are separate objects encased in flexible coverings.

The present invention is directed to those embodiments of the thermal energy conversion system and method wherein the expandites are unencased fluids. The method of thermal energy conversion according to the present invention includes the steps of: (a) providing a mass of unencased fluid expandites in a mass transport conduit circuit at a first combination of temperature and pressure; (b) introducing a non-gaseous thermal fluid into the mass transport conduit circuit from a source external to the mass transport conduit circuit at a second combination of temperature and pressure; (c) combining the provided expandite mass with the introduced thermal fluid in a given conduit of the circuit to create an expandite-fluid mixture having a density at some place in the given conduit that is changed from the average proportional density of the expandite mass and the thermal fluid at their respective prevailing combination of temperature and pressure prior to such combination with each other to create a pressure differential that enhances the flow of the fluids contained within the circuit; (d) directing at least a portion of fluids contained within the circuit to flow vertically through a given portion of the conduit circuit to create a pressure differential in the given portion of the circuit in relation to the remainder of the conduit circuit to thereby enhance the flow of the fluids contained within the conduit circuit, and (e) converting the pressure of at least a part of the enhanced flow of the contained fluids through the conduit circuit into a useful form of energy. Step (a) includes the steps of: (f) separating from the expandite-fluid mixture, an expandite base which comprises at least a portion of the expandite mass; and (f') thermally conditioning the expandite base.

An expandite is a material (or combination of materials) circulated through the mass transport conduit circuit that changes density in response to a change in temperature at a given pressure. The expandite material may be a combination of materials that are chosen to provide a desired density at a given combination of temperature and pressure.

A thermal fluid is a fluid that is introduced from a source external to the mass transport conduit circuit at a temperature that is either substantially above or substantially below the temperature of the expandite prior to initial combination therewith.

Either, or both, of the thermal fluid and the expandite material may change phase as a result of the combination with each other. However, a phase change is not required.

The expandite and the thermal fluid are different materials that do not react with each other chemically, whereby their respective chemical compositions remain essentially unchanged upon their combination with one another in the preferred embodiment.

Additional features of the present invention are described in the description of the preferred embodiments.

BRIEF DESCRIPTION OF THE DRAWING

FIGS. 1 through 14 are schematic diagrams of different preferred embodiments of the system of the present invention.

In each figure, the system is shown in a vertical plane, wherein the upper portion of the system is shown in the upper portion of the view. In an OTEC system, the upper portion of the system typically is at or near the ocean surface.

DESCRIPTION OF THE PREFERRED EMBODIMENTS

Figure 1:
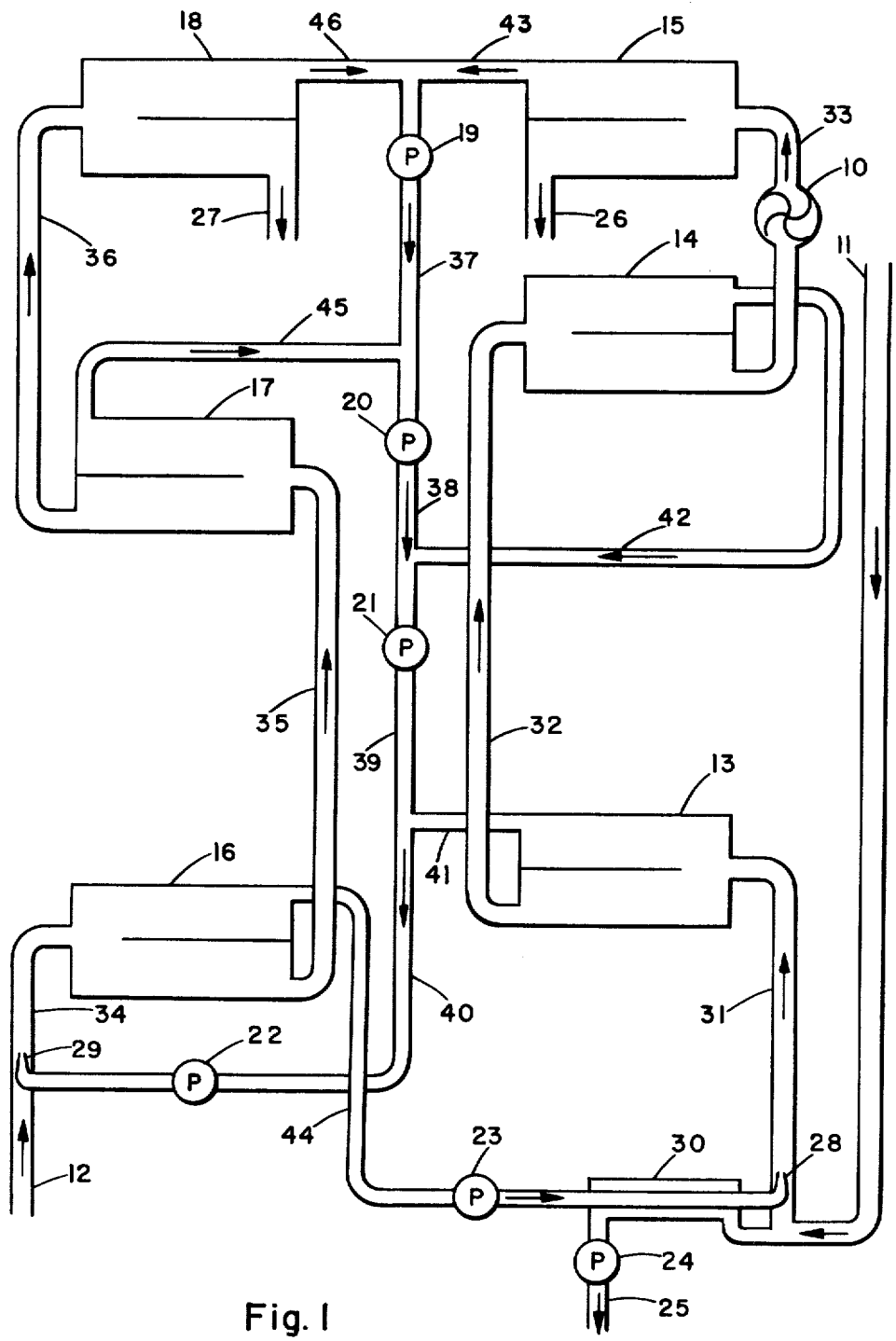

Referring to FIG. 1, one preferred embodiment of the system of the present invention is an OTEC system having a turbine generator 10, and a mass transport conduit system including a warm water intake conduit 11; a cold water intake conduit 12; gravity separation tanks 13, 14, 15, 16, 17 and 18; pumps 19, 20, 21, 22, 23 and 24; outlet conduits 25, 26 and 27, injection nozzle systems 28 and 29, a heat exchange 30; vertical conduit sections 31, 32, 33, 34, 35, 36, 37, 38, 39 and 40; and separation tank outlet conduits 41, 42, 43, 44, 45 and 46.

In the system of FIG. 1, a mass of unencased expandites, such as liquid ethane, is provided in the conduit 44 at a first combination pressure and temperature, and a first thermal fluid, such as warm ocean water, is introduced into the circuit through the conduit 11 at a second combination of pressure and temperature. The expandite mass is injected through the nozzle system 28 into the vertical conduits 31 where it is combined with the warm ocean water to create a first expandite-fluid mixture that flows upward through the conduit section 31 in response to the pressure differential created by the change in average proportional density of the first expandite-fluid mixture resulting from such combination. Further, by directing the first expandite-fluid mixture vertically through the conduit section 31, a pressure differential is created in the conduit section 31 in relation to the remainder of the mass transport conduit circuit for drawing the mixture upward through the conduit section 31.

The first expandite-fluid mixture is directed from the conduit section 31 through a first series of gravity separation tanks 13, 14 and 15, for separating the first expandite-fluid-mixture into an expandite base and a separated first thermal fluid. Ethane gas is lighter than ocean water, and thereby may be drawn from the top of the gravity separation tanks 13, 14 and 15, whereas the ocean water may be drawn from the bottom of these tanks. Accordingly, some expandite base is drawn through conduit 41 from the gravity separation tank 13 and a diluted first expandite fluid-mixture which contains a greater proportion of thermal fluid is drawn-up through conduit section 32.

The first expandite-fluid mixture is passed through the series of gravity separation tanks 13, 14 and 15 to provide successively lower pressures for enabling separation from the first expandite-fluid mixture at successively lower pressures, of expandite base that was not separated at the higher pressures. Additional expandite base is separated from the mixture by the gravity separation tank 14 and is drawn therefrom through the conduit 42. The further diluted first expandite-fluid mixture is drawn from the separation tank 14 through vertical conduit 33.

The turbine generator 10 is positioned in the conduit 33 for converting the pressure of the flow of the first expandite-fluid mixture through the conduit 33 into a useful form of energy, such as electricity.

The pressure of the flow of the first mixture through the conduit 33 is greatly decreased upon the first mixture flowing through the turbine generator 10. As a result, the pressure of the first mixture flowing from conduit 33 into the separation tank 15 is at a relatively low pressure for enabling almost all of the remaining expandite base to be separated therefrom and drawn from the tank 15 through the conduit 43.

Also the tank is at or near the ocean surface, and thereby at an elevation where the ambient pressure outside the tank 15 is close to the pressure of the mixture inside the tank. By positioning the separation tanks 14 and 15 at depths (or elevations) which enable the gravity separation process to be carried out with the pressure of the first mixture close to or approximately the same as the ambient pressure, the walls of the tanks need not be very thick, thereby enabling the use of less expensive gravity separation tanks.

The pressure within the gravity separation tank 15 typically is below atmospheric pressure for enhancing the separation of the expandite from the first expandite fluid mixture.

The separated thermal fluid separated from the first mixture by the gravity separation tank 15 is discharged from the mass transport conduit circuit through the outlet conduit 26.

The separated expandite base drawn from the separation tanks 13, 14 and 15 is directed to the conduit 40, from which it is injected under pressure by the nozzle system 29 into a second thermal fluid, such as cold ocean water, within the conduit 34. The cold ocean water is introduced into the circuit through inlet conduit 12 at a third combination of temperature and pressure and is combined with the separated expandite base in the conduit 34 to form a second expandite-fluid mixture.

The second expandite-fluid mixture also is passed through a series of gravity separation tanks, to wit: tanks 16, 17 and 18. Expandite means is separated from the second expandite-fluid mixture in the gravity separation tank 16 and is directed through the conduit 44. By combining the expandite mass in the conduit 40 with the cold ocean water and then separating the resultant second expandite-fluid mixture, the expandite base is thermally conditioned (cooled) to provide the expandite mass at the first combination of pressure and temperature in the conduit 44. The pressure of the expandite mass in the conduit 44 may be increased by the pump 23 to increase the dispersal rate of the expandite mass into the ocean water to thereby increase the rate of the density change of the first expandite-fluid mixture. Also the expandite mass in the conduit 44 may be preheated by passing it through the heat exchanger 30, in which it is heated by some of the warm ocean water drawn into the circuit through the inlet conduit 11.

By preheating the expandite mass prior to combining it with the warm ocean water in the conduit 31, the density change in the first expandite-fluid mixture is increased. The warm ocean fluid that passed through the heat exchanger 30 is pumped by the pump 24 and discharged from the circuit through the outlet conduit 25.

The second expandite-fluid mixture is diluted by the separation of the expandite mass from the separation tank 16. The diluted second expandite-fluid mixture is drawn from the separation tank 16 through the vertical conduit 35 into the separation tank 17. Additional expandite is separated from the second expandite-fluid mixture in the separation tank 17 and drawn therefrom through the conduit 45. The further diluted second expandite-fluid mixture is directed upward through the vertical conduit 36 to a final separation tank 18, which is at or near the ocean surface. Almost all of the remaining expandite is separated from the second expandite-fluid mixture in the separation tank 18 and drawn therefrom through the conduit 46. The second thermal fluid that is separated from the expandite-fluid mixture in the separation tank 18 is discharged from the mass transport conduit circuit via the outlet conduit 27. The separated expandite drawn from the separation tanks 15 and 18 is drawn through the conduit 37 by the pump 19, is combined with the expandite drawn from the separation tank 17. This combination is drawn through the conduit 38 by the pump 20 and is combined with the expandite drawn from the separation tank 14. This combination is drawn through the conduit 39 by the pump 21 and is combined with the expandite base drawn from the separation tank 13 to provide the separated expandite base in the conduit 40 that is combined with the cold ocean water. The separated expandite base may be pumped through the conduit 40 by the pump 22 to be at an increased pressure when combined with the cold ocean water so as to increase the rate of dispersal to thereby increase the rate of cooling of the separated expandite base. The pumps 19, 20 and 21 also aid in increasing the pressure of the flow of the separated expandite base. The amount of added pressure that is provided by the pumps 19, 20, 21 and 22 is related to the pressure of the flow of the separated expandite base from the respective separation tanks 13, 14, 15, 17 and 18. These pumps consume negligible energy in relation to the energy converted by the system.

By separating expandite from the first and second expandite-fluid mixtures at the higher pressures prevailing within the gravity separation tanks 13, 14, 16 and 17 energy is saved, in that not as much pumping is required to increase the pressure of the separated expandite prior to combining it with the first and second thermal fluids respectively in vertical conduits 31 and 34.

The separation tanks 16, 17 and 18 are positioned at depths where the ambient pressure outside the tanks is close to or approximately the same as the pressure of the second expandite-fluid mixture within the tanks so as to enable the use of separation tanks having relatively thin walls. The pressure within the gravity separation tank 18 typically is below atmospheric pressure to enhance separation of the expandite from the second expandite-fluid mixture.

Pressure differentials are created in the respective vertical conduit sections 32, 33, 34, 35 and 36 in relation to the remainder of the conduit circuit for drawing the mixtures contained therein vertically upward through the respective conduit sections in the same manner as the first expandite-fluid mixture is drawn vertically upward through the vertical conduit section 31.

Alternatively, or in addition to the placement of the turbine generator 10 in the conduit 33, turbine generators (not shown) may be placed in the inlet conduit 11 to provide energy by converting the pressure of the flow of the warm ocean water drawn into the circuit; in the inlet conduit 12 to provide energy by converting the pressure of the flow of the cold ocean water drawn into the circuit; in the conduit 36 to provide energy by converting the pressure of the flow of the second expandite-fluid mixture; and/or in either or both of the outlet conduits 26 and 27 to convert the pressure of the flow of the separated thermal fluid. By placing the turbine generator in the inlet conduit 11, the pressure of the first thermal fluid is reduced, whereby the pressure of the first expandite-fluid mixture within the conduit 31 also is reduced. This enables the gravity separation tank 13 to be at an ocean depth where the pressure inside the tank is approximately the same as the ambient pressure.

The turbine generator must be positioned at a depth of the intake conduit 11 sufficient to provide a sufficient pressure differential across the turbine generator.

The warm water intake conduit 11 and the cold water intake conduit 12 draw ocean water from such respective depths as required to provide water at temperatures that are sufficiently different to create sufficient pressure differentials within the circuit to enable economical energy conversion.

When the expandite material has the property of becoming more dense when heated, the system shown in FIG. 1 can nevertheless be used if it is modified to reverse the connections of the warm water intake conduit 11 and the cold water intake conduit 12 to the remainder of the circuit. That is the conduit 11 is connected to the conduit 34 and the conduit 12 is connected to the conduit 31.

Other modifications of the system also will be obvious to those skilled in the art when using other expandite materials, such as modifying the system to combine the expandite mass with the first thermal fluid at an elevation at or near sea level and to direct the flow of the resulting expandite-fluid mixture vertically downward in response to the change in average proportional density in the mixture resulting from such combination.

Alternative preferred embodiments are shown in FIGS. 2 through 14. In these embodiments, generally only one separation tank is shown for each separation step. However, it should be understood that in actual practice, a cascaded series of separation tanks may be used, as described in relation to the system of FIG. 1.

The system of FIG. 2 includes two turbine generators 46 and 47 and a mass transport conduit circuit including a warm water inlet conduit 48, a cold water inlet conduit 49, gravity separation tanks 50 and 51, injection nozzle systems 52 and 53; outlet conduits 54 and 55; vertical conduits 56 and 57 and separation tank outlet conduits 58, 59, 60 and 61.

An expandite mass, such as nitrobenzene, is provided in the conduit 60 at a first combination of pressure and temperature and a first thermal fluid, such as warm ocean water, is introduced into the circuit through the conduit 48 at a second combination of pressure and temperature. The expandite mass is injected through the nozzle system 53 into the vertical conduit 57 where it is combined with the warm ocean water to create a first expandite-fluid mixture that flows downward through the conduit section 57 in response to the pressure differential created by the change in average proportional density of the first expandite fluid mixture resulting from such combination. Further by directing the first expandite-fluid mixture vertically through the conduit section 57, a pressure differential is created in the conduit section 57 in relation to the remainder of the mass transport conduit circuit for drawing the mixture downward through the conduit section 57.

The expandite fluid mixture is directed from the vertical conduit 57 into the gravity separation tank 51, where it is separated into a separated expandite base which flows out of the tank 51 through the conduit 58 and a separated first thermal fluid which flows out of the tank 51 through the conduit 59 is directed through the turbine generator 46, which converts the pressure of the flow to electricity. After flowing through the turbine generator 46, the separated first thermal fluid is discharged from the circuit through the conduit 54.

A second thermal fluid, such as cold ocean water, is introduced into the circuit through the conduit 49 at a third combination of pressure and temperature. The separated expandite base in conduit 58 is injected through the nozzle system 52 into the vertical conduit 56 where it is combined with the cold ocean water to create a second expandite-fluid mixture that flows upward through the conduit section 56 in response to the pressure differential created by the change in average proportional density of the second expandite-fluid mixture resulting from such combination. Further, by directing the second expandite-fluid mixture vertically through the conduit section 56, a pressure differential is created in the conduit section 56 in relation to the remainder of the mass transport conduit circuit for drawing the second mixture upward through the conduit section 56.

The second expandite fluid mixture is directed from the vertical conduit 56 into the gravity separation tank 50, where it is separated into the expandite mass at the first combination of temperature and pressure, which flows out of the tank 50 through the conduit 60, and a separated second thermal fluid, which flows out of the tank 50 through the conduit 61.

The separated second thermal fluid in the conduit 61 is directed through the turbine generator 47, which converts the pressure of the flow to electricity. After flowing through the turbine generator 47, the separated second thermal fluid is discharged from the circuit through the conduit 55.

By combining the separated expandite base with the cold ocean water, the separated expandite base was thermally conditioned to provide the expandite mass at the first combination of temperature and pressure in the conduit 60.

Both the turbine generators 46, 47 are located at or near the ocean surface in the system of FIG. 2. Turbine generators can be placed in the conduit sections 48, 49, 56, 57, 58 and/or 60 to convert the pressure of the flow in these portions of the circuit into electricity.

The system of FIG. 3 includes a turbine generator 63 and a mass transport conduit circuit including a warm water inlet conduit 64, a cold water inlet conduit 65, gravity separation tanks 66, 67 and 68, injection nozzle systems 69, 70, 71 and 72, outlet conduits 73 and 74, vertical conduit sections 75 and 76, conduit sections 77, 78, 79, 80, 81, 82, 82a and 83 and pumps 84 and 85.

An expandite mass, such as ethane is provided in the conduit 81 at a first combination of pressure and temperature, and a first thermal fluid, such as cold ocean water, is introduced into the circuit through the conduit 65 at a second combination of pressure and temperature. The expandite mass in the conduit 81 is injected through the nozzle system 70 into the vertical conduit 76 where it is combined with the cold ocean water to create a first expandite-fluid mixture that flows upward through the conduit section 76 in response to the pressure differential created by the change in average proportional density of the first expandite-fluid mixture resulting from such combination.

The first expandite-fluid mixture is directed into the separation tank 66, where it is separated into a separated expandite base which flows from the tank 66 through the conduit 77, and a separated first thermal fluid, which flows from the tank 66 and is discharged from the circuit through the conduit 73.

The separated expandite base in the conduit 77 is passed through the pump 85 to increase its pressure and then it is directed into the conduits 78 and 80. A second thermal fluid, such as warm ocean water, is introduced into the circuit through the inlet conduit 64 and is pumped by the pump 84 to be at a third combination of a pressure and temperature. The separated expandite base in conduit section 78 is injected through the nozzle system 69 into the conduit section 83 where it is combined with the warm ocean water to thermally condition (heat) the separated expandite base a second expandite-fluid mixture created by such combination the conduit 83 is directed into the gravity separation tank 67 where it is separated into the expandite mass, which flows from the tank 67 through the conduit 79, and a separated second thermal fluid, which flows from the tank 67 and is discharged from the circuit through the conduit 74.

A working fluid, such as water, is provided in the conduit 82a. The expandite mass in the conduit 79 is injected through the nozzle system 71 into the vertical conduit section 75 where it is combined with the working fluid to create an expandite working-fluid mixture that flows vertically upward through the vertical conduit 75 whereby a pressure differential is created in the conduit section 75 in relation to the remainder of the mass transport conduit for drawing the mixture upward through the conduit section 75.

The portion of the separated expandite base in the conduit 80 is inserted through the nozzle system 72 into the expandite working fluid mixture in the conduit 75 to increase the density change of the expandite-working fluid mixture.

The expandite working fluid mixture in the conduit 75 is directed into the gravity separation tank 68 where it is separated into the expandite mass, which flows from the tank 68 through the conduit 81 at the first combination of pressure and temperature, and the working fluid, which flows from the tank 68 through the conduit 82 is directed through the turbine generator 63, which converts the pressure of the flow into electricity. Following such conversion the working fluid flows through the conduit 82a at a reduced pressure.

The turbine generator 63 is positioned at an ocean depth which enables the separation tank 68 to be located where the ambient pressure outside the tank 68 is approximately the same as the pressure within the tank.

Turbine generators can be placed in the conduit sections 65, 73, 74, 75 and 76 to convert the pressure of the flow in these portions of the circuit into electricity.

Another working fluid embodiment is shown in FIG. 4. The system of FIG. 4 includes a turbine generator 87, and a mass transport conduit circuit including gravity separation tanks 88, 89 and 90, injection nozzle systems 91, 92 and 93, pump 94 and 95, vertical conduit sections 96 and 97, a warm water inlet conduit 98, a cold water inlet conduit 99, outlet conduits 100 and 101; conduit sections 102, 103, 104, 105, 106 and 107.

An expandite mass, such as low-density ethane, is provided in the conduit 106 at a first combination of pressure and temperature; and a first thermal fluid, such as cold ocean water, is introduced into the circuit through the conduit 99 at a second combination of pressure and temperature. The expandite mass in the conduit 106 is injected through the nozzle system 92 into the vertical conduit 96, where it is combined with the cold ocean water to create a first expandite-fluid mixture that flows upward through the conduit section 96 in response to the pressure differential created by the change in average proportional density of the first expandite-fluid mixture resulting from such combination.

The first expandite fluid mixture is directed into the separation tank 89, where it is separated into a separated expandite base, which flows from the tank 89 through the conduit 102, and a separated first thermal fluid, which flows from the tank 89 and is discharged from the circuit through the conduit 101.

The separated expandite base in the conduit 102 is passed through the pump 95 to increase its pressure.

A second thermal fluid, such as warm ocean water, is introduced into the circuit through the inlet 98 and is pumped by the pump 94 to be at a third combination of temperature and pressure. The separated expandite base in the conduit 102 is injected through the nozzle system 91 into the conduit section 103 where it is combined with the warm ocean water to thermally condition (heat) the separated expandite base. A second expandite-fluid mixture created by such combination in the conduit 103 is directed into the separation tank 90 where it is separated into the expandite mass which flows from the tank 90 through the conduit 104, and a separated second thermal fluid, which flows from the tank 90 and is discharged from the circuit through the conduit 100.

A working fluid, such as high density ethane is provided in the conduit 105. The expandite mass in the conduit 104 is injected through the nozzle system 93 into the vertical conduit section 97 where it is combined with the working fluid to create an expandite-working fluid mixture that flows vertically upward through the vertical conduit 97. By directing the expandite-working fluid mixture vertically through the conduit 97, a pressure differential is created in the conduit section 97 in relation to the remainder of the mass transport conduit circuit for drawing the mixture upward through the conduit section 97.

The expandite-working fluid mixture in the conduit 97 is directed into the gravity separation tank 88 where it is separated into the expandite mass, which flows from the tank 88 through the conduit 106 at the first combination of pressure and temperature, and the working fluid, which flows from the tank 88 through the conduit 107. The working fluid in the conduit 107 is directed through the turbine generator 87, which converts the pressure of the flow into electricity. Following such converstion, the working fluid flows through the conduit 105 for recombination with the expandite mass.

The turbine generator is conveniently located at or near the ocean surface. Turbine generators can be placed in the conduit sections 96, 97, 99, 100 and 101 to convert the pressure of the flow in these portions of the circuit into electricity.

The embodiment of FIG. 5 includes a turbine generator 109, and a mass transport conduit circuit including a warm water inlet conduit 110; a cold water inlet conduit 111 conduit sections 112, 113, 114, 115, 116, 117, 118, 119, 120, 121, 122, 123 and 124, gravity separation tanks 125, 126, 127 and 128; pumps 129, 130 and 131; and injection nozzle systems 132 and 133.

An expandite mass such as ethane or butane, is provided in the conduit 112 at the first combination of temperature and pressure; and a first thermal fluid, such as cold ocean water, is introduced into the circuit through the conduit 111 at a second combination of pressure and temperature. The expandite mass in the conduit 112 is injected through the nozzle system 132 into the conduit 113, where it is combined with the cold ocean water to create a first expandite fluid mixture that flows through the conduit section 113 in response to the pressure differential created by the change in average proportional density of the first expandite-fluid mixture resulting from such combination.

The first expandite-fluid mixture is directed into the separation tank 125, where it is partially separated into a separated expandite base, which flows from the tank 125 through the conduit 114, and a partially separated first expandite-fluid mixture, which flows from the tank 125 through the conduit 116 and into the separation tank 126 located at a higher elevation. The partially separated first expandite-fluid mixture is separated within the separation tank 126 into separated expandite, which flows from the tank 126 through the conduit 117, and separated first thermal fluid which flows from the tank 126 and is discharged from the circuit through the conduit 118.

The separated expandite in the conduit 117 is combined with separated expandite flowing from the conduit 122 and directed downward through the conduit 124. The pressure of the flow in the conduit 124 is increased by the pump 131. The separated expandite in the conduit 124 is combined with the separated expandite base flowing from the conduit 114 and directed downward through the conduit 115. The pressure of the flow in the conduit 115 is increased by the pump 129.

A second thermal fluid, such as warm ocean water is introduced into the circuit through the inlet conduit 110 and pumped by the pump 130 to be at a third combination of pressure and temperature. The separated expandite base in the conduit 115 is injected through the nozzle system 133 into the conduit 119, where it is combined with the warm ocean water to thermally condition (heat) the separated expandite base and to create a second expandite-fluid mixture that flows through the conduit section 119 in response to the pressure differential created by the change in average proportional density of the second expandite-fluid mixture resulting from such combination.

The second expandite-fluid mixture is directed into the separation tank 127, where it is partially separated into the expandite mass, which flows from the tank 127 through the conduit 120, and a partially separated second expandite-fluid mixture, which flows from the tank 127 through the conduit 121. The partially separated second expandite-fluid mixture is directed vertically through the conduit 121, whereby a pressure differential is created in the conduit section in relation to the remainder of the mass transport conduit circuit for drawing the mixture upward through the vertical portion of the conduit 121. The partially separated second expandite-fluid mixture is directed into the separation tank 128 where it is separated into separated expandite, which flows from the tank 128 through the conduit 122, and a separated second thermal fluid, which flows from the tank 128 and is discharged from the circuit through the conduit 123.

The expandite mass in the conduit 120 is directed through the turbine generator 109, which converts the pressure of the flow into eletricity and also reduces the pressure of the expandite mass in the conduit 112 at the first combination of pressure and temperature.

The turbine generator 109 and the separation tanks 125 and 127 are positioned at ocean depths in relation to each other for causing the pressure within the tanks 125 and 127 to be such that the tanks 125 and 127 are located at ocean depths where the respective ambient pressures outside the tanks are approximately the same as the pressures within the tanks.

Figures 6, 7:
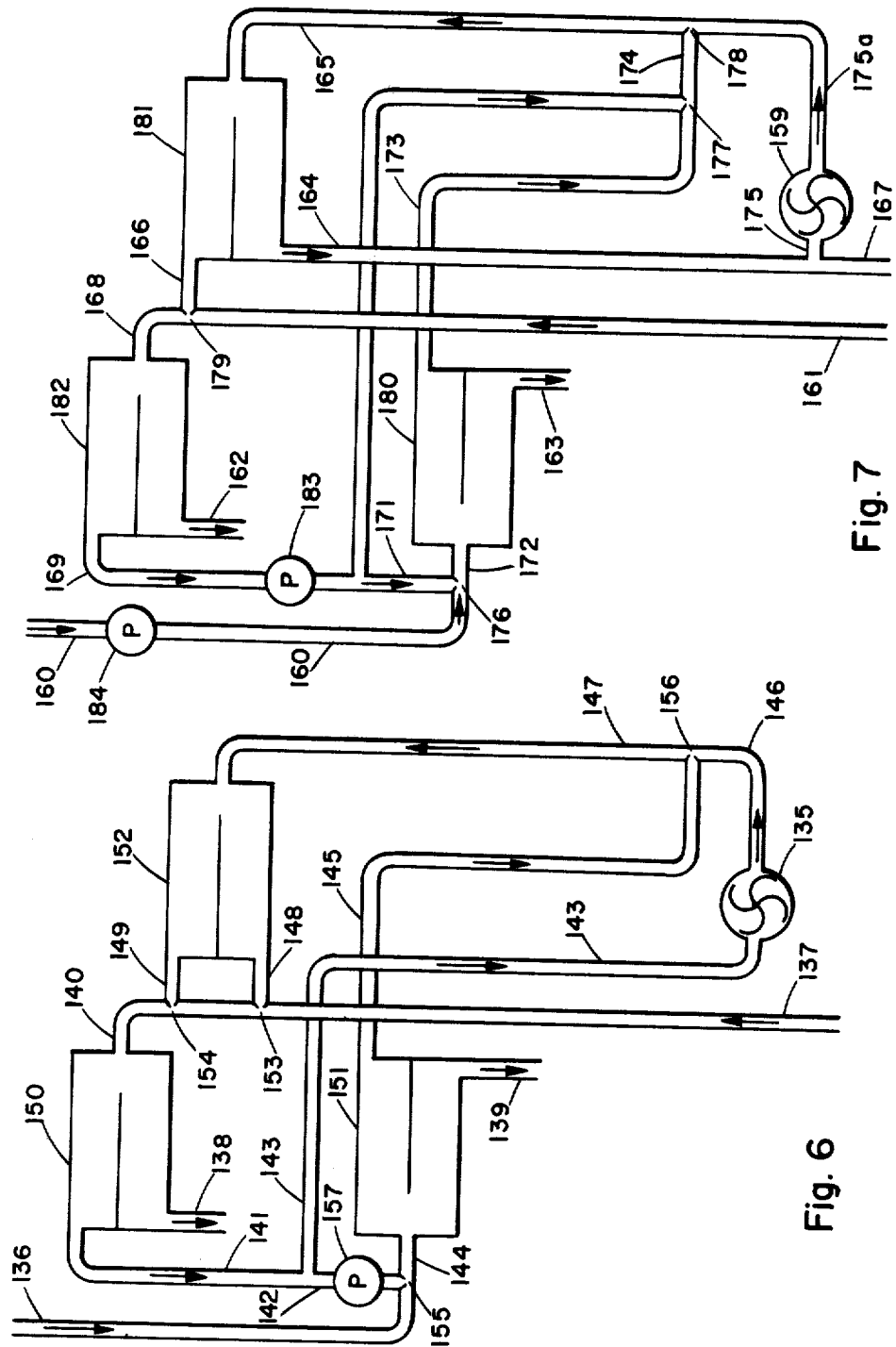

Another working fluid embodiment is shown in FIG. 6. This embodiment includes turbine generator 135 and a mass transport conduit circuit including a warm water inlet conduit 136, a cold water inlet conduit 137, outlet conduits 138 and 139, conduit sections 140, 141, 142, 143, 144, 145, 146, 147, 148 and 149, gravity separation tanks 150, 151 and 152, injection nozzle systems 153, 154, 155 and 156, and a pump 157. In this system, the expandite and the working fluid are the same material, such as ethylene, although of different densities. The expandite mass consists of a mixture of the working fluid and the expandite base, which have different densities.

The expandite mass is provided in the conduit 147 as the first combination of temperature and pressure and directed into the separation tank 152, where it is separated into the expandite base, which flows from the tank 152, through the conduit 148, and the working fluid which flows from the tank 152 through the conduit 149.

A first thermal fluid, such as cold ocean water is introduced into the circuit through the conduit 137 at a second combination of pressure and temperature. The expandite base in the conduit 148 and the working fluid in the conduit 149 are injected through nozzle systems 153 and 154 respectively into the conduit 140 where they are combined with the cold ocean water to create a first expandite-fluid mixture that flows upward through the conduit section 140 in response to the pressure differential created by the change in the average proportional density of the first expandite-fluid mixture resulting from such combination.

The first expandite-fluid mixture is directed into the separation tank 150, where it is separated into a separated expandite base, which flows from the tank 150 through the conduit 141, and a separated first thermal fluid which flows from the tank 150 and is discharged from the circuit through the conduit 138. The separated expandite base in conduit 141 is separated into the conduits 142 and 143. The working fluid consists of the separated expandite base flowing through the conduit 143. If the working fluid were a different material than the expandite base, a separation tank would be required to separate the fluid flowing through the conduit 141 into the fluid flow through the conduits 142 and 143.

The pressure of the separated expandite base flowing in the conduit 142 is increased by the pump 157.

A second thermal fluid, such as warm ocean water, is introduced into the circuit through the conduit 136. The separated expandite base in the conduit 142 is injected through the nozzle system 155 into the conduit section 144, where it is combined with the warm ocean water to thermally condition (heat) the separated expandite base. A second expandite-fluid mixture created by such combination in the conduit 144 is directed into the gravity separation tank 151, where it is separated into a thermally conditioned expandite base, which flows from the tank 151 through the conduit 145, and a separated second thermal fluid, which flows from the tank 151 and is separated from the system through the conduit 139.

The working fluid in the conduit 143 is directed through the turbine generator 135, which converts the pressure of the flow to electricity and provides the working fluid at a reduced pressure in the conduit 146.

The thermally conditioned expandite base in the conduit 145 is injected through the nozzle system 156 into the conduit 147 where it is combined with the working fluid to provide the expandite mass. The expandite mass is directed upward through the vertical conduit 147 to provide the expandite mass at the first combination of pressure and temperature. By directing the expandite mass vertically through the conduit 147, a pressure differential is created in the conduit section 147 in relation to the remainder of the circuit for drawing the expandite mass upward through the conduit section 147

The embodiment of FIG. 7 includes a turbine generator 159, and a mass transport conduit circuit including a warm water inlet conduit 160; a cold water inlet conduit 161; outlet conduits 162, 163 and 167, conduits 165, 166, 168, 169, 170, 171, 172, 173, 174, 175, and 175a; injection nozzle systems 176, 177, 178 and 179; gravity separation tanks 180, 181 and 182; and pumps 183 and 184. The system further includes a conduit section 164 that is external to the mass transport conduit circuit.

An expandite mass, such as ethane, is provided in the conduit 174 at a first combination of pressure and temperature, and a first thermal fluid, such as ocean water, is provided in the conduit 175a at a second combination of pressure and temperature. The expandite mass in the conduit 174 is injected through the nozzle system 178 into the vertical conduit 165 which it is combined with the first thermal fluid to create a first expandite fluid mixture that flows upward through the conduit 165 is response to the pressure differential created by the change in average proportional density of the first expandite-fluid mixture resulting from such combination.

By directing the first expandite-fluid mixture vertically through the conduit 165, a pressure differential is created in the conduit section 165 in relation to the remainder of the mass transport conduit circuit for drawing the mixture upward through the conduit section 165.

The first expandite-fluid mixture in the conduit 165 is directed into the separation tank 181, where it is separated into a separated expandite base, which flows from the tank 181 through the conduit 166, and a separated first thermal fluid which flows from the tank 181 and is discharged from the circuit into the external conduit 164. From the external conduit 164, the separated first thermal fluid is directed through the conduits 167 and 175. The excess first thermal fluid is discharged from the circuit through the conduit 167. The separated first thermal fluid in the conduit 175 is directed through the turbine generator 159, which converts the pressure of the flow to electricity, and provides the first thermal fluid at the second combination of pressure and temperature in the conduit 175a.

A second thermal fluid, such as cold ocean water, is introduced into the circuit through the inlet conduit 161 at a third combination of pressure and temperature. The separated expandite base in the conduit 166 is injected through the nozzle system 179 into the conduit 168 where it is combined with the cold ocean water to thermally condition (cool) the separated expandite base. A second expandite-fluid mixture created by such combination in the conduit 168 is directed into the separation tank 182, where it is separated into expandite mass, which flows from the tank 182 through the conduit 169, and a separated second thermal fluid, which flows from the tank 182 and is discharged from the circuit through the conduit 162.

The pressure of the expandite mass in the conduit 169 is increased by the pump 183 and the expandite mass is directed through conduits 170 and 171.

A third thermal fluid, such as warm ocean water, is introduced into the system through the inlet conduit 160, and has its pressure increased by the pump 184.

The portion of the expandite mass in the conduit 171 is injected through the nozzle system 176 into the conduit section 172, where it is combined with the warm ocean water from the conduit 160 to thermally condition (heat) the expandite mass. A third expandite-fluid mixture created by such combination in the conduit 172 is directed into the separation tank 180, where it is separated into a heated expandite mass, which flows from the tank 180 through the conduit 172, and a separated third thermal fluid which flows from the tank 180 and is discharged from the system through the conduit 163.

The expandite mass in the conduit 170 is injected through the nozzle system 177 into the conduit 174 where it is combined with the heated expandite mass from the conduit 173 to provide the expandite mass at the first combination of pressure and temperature in the conduit 174.

The turbine generator 159 and the separation tanks 180, 181 and 182 are positioned at ocean depths in relation to each other for causing the pressure within the tanks 180, 181 and 182 to be such that the tanks 180, 181 and 182 are located at ocean depths where the respective ambient pressures outside the tanks are approximately the same as the pressures within the tanks.

Figure 8:
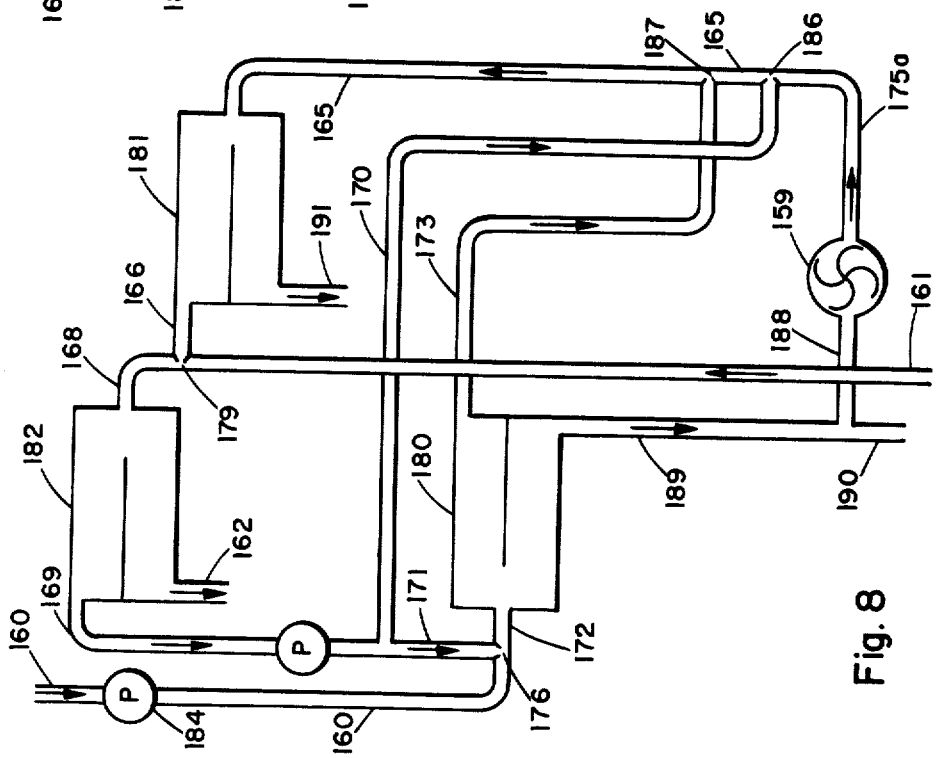

The embodiment of FIG. 8 is similar to the embodiment of FIG. 7, with only three significant variations. The portions of the FIG. 8 embodiment that are the same as the FIG. 7 embodiment are indicated by the same reference numerals in the Drawing.

One variation is that the expandite mass is provided in the conduit 170 at the first combination of pressure and temperature, and is injected through an injection nozzle system 186 into the conduit 165 where it is combined with the thermal fluid in the conduit 175a to create the expandite-fluid mixture; and the heated expandite mass in the conduit 173 is injected through an injection nozzle system 187 into the conduit 165 where it is combined with the expandite-fluid mixture.

A second variation is that the first thermal fluid that is directed to the turbine generator 159 is provided through a conduit 188 from a conduit 189, which draws the separated thermal fluid from the separation tank 180. Excess separated thermal fluid in the conduit 189 is discharged from the circuit through an outlet conduit 190.

A third variation is that the separated first thermal fluid that flows from the tank 181 is discharged from the circuit through the conduit 191.

Figure 9:
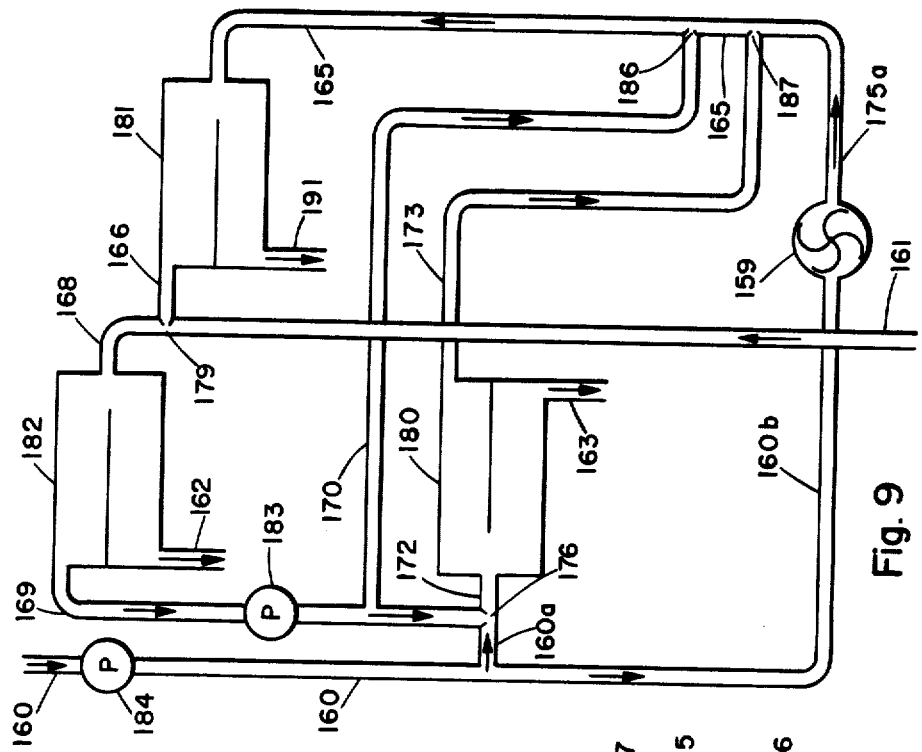

The embodiment of FIG. 9 combines several of the features of the embodiments of FIGS. 7 and 8, with the portions thereof that are the same being indicated by like reference numerals in the Drawing. It should be noted, however, that in the embodiment of FIG. 9, the heated expandite mass in the conduit 173 is injected through the nozzle system 187 into the conduit 165 prior to the expandite mass in the conduit 170 being injected into the conduit 165 through the nozzle system 186. This means that the heated expandite mass in the conduit 173 is injected into the vertical conduit 165 and combined 175a; and the expandite mass in the conduit 170 is injected into the resulting mixture of the first thermal fluid and heated expandite mass in the conduit 165 to create the first expandite-fluid mixture therein.

Another significant variation is that the first thermal fluid that is directed to the turbine generator 159 is provided through a conduit 160b from the warm water inlet conduit 160.

Warm water introduced through the conduit 160 also is directed through the conduit 160a into the conduit 172, where it is combined with the expandite mass from the conduit 171.

Figure 10:
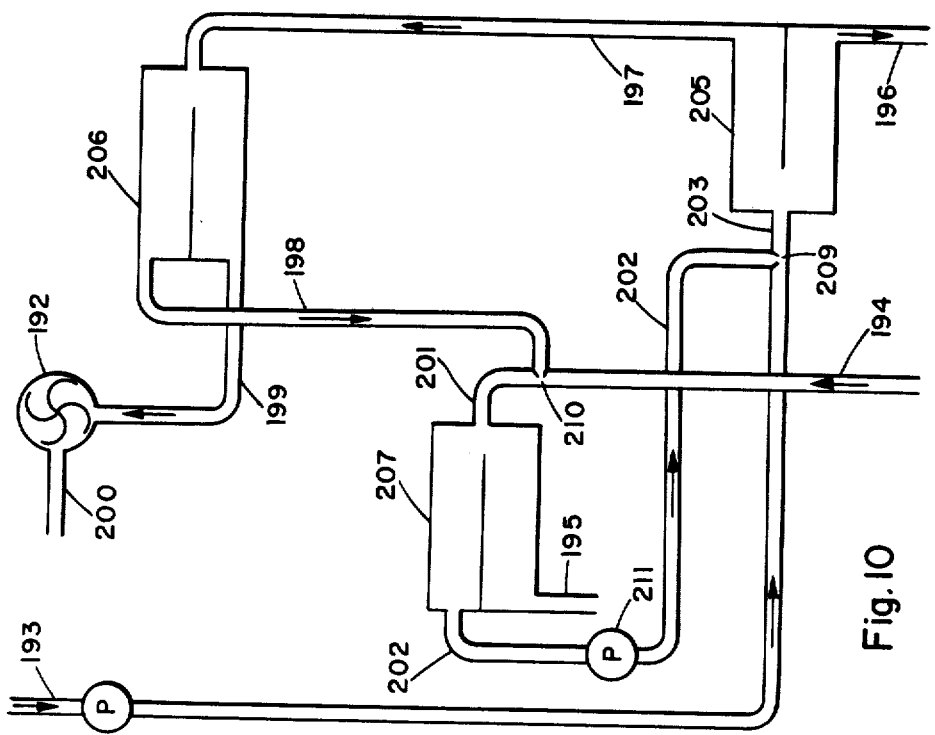

The embodiment of FIG. 10 utilizes a partially separated expandite mass. This embodiment includes a turbine generator 192, and a mass transport conduit system including a warm water inlet conduit 192, a cold water inlet conduit 194, outlet conduits 195 and 196, conduits 197, 198, 199, 200, 201, 202 and 203; gravity separation tanks 205, 206 and 207; injection nozzle systems 209 and 210; and a pump 211.

An expandite mass, such as ethane, is provided in the conduit 202 at a first combination of pressure and temperature, and a first thermal fluid, such as warm ocean water, is introduced into the circuit through the conduit 193 at a second combination of pressure and temperature. The expandite mass in the conduit 202 is injected through the nozzle system 209 into the conduit 203, where it is combined with the first thermal fluid to create a first expandite-fluid mixture that flows into the separation tank 205 in response to the pressure differential created by the change in average proportional density of the first expandite-fluid mixture resulting from such combination.

The first expandite-fluid mixture is separated in the separation tank 205 into a partially separated expandite mass, which flows from the tank 205 and is directed upward through the vertical conduit 197, and a first separated first thermal fluid, which flows from the tank 205 and is discharged from the circuit through the conduit 196.

By directing the partially separated expandite mass vertically through the conduit 197, a pressure differential is created in the conduit section 197 in relation to the remainder of the mass transport circuit for drawing the partially separated expandite mass upward through the conduit section 197.

The partially separated expandite mass in the conduit 197 is directed into the separation tank 206, where it is separated into a separated expandite base, which flows from the tank 206 through the conduit 198, and a second separated first thermal fluid which flows from the tank 206 through the conduit 199. The turbine generator 192 converts the pressure of the flow of the second separated first thermal fluid in the conduit 199 into electricity. The second separated first thermal fluid flows from the turbine generator 192 and is discharged from the circuit through the conduit 200.

A second thermal fluid, such as cold ocean water, is introduced into the circuit through the inlet conduit 194 at a third combination of temperature and pressure. The separated expandite base in the conduit 198 is injected through the nozzle system 210 into the conduit 201 where it is combined with the second thermal fluid to thermally condition (cool) the separated expandite base and to create a second expandite-fluid mixture in the conduit 201.

The second expandite-fluid mixture in the conduit 201 is directed into the separation tank 207 where it is separated into the expandite mass, which flows from the tank 207 though the conduit 202, and a separated second thermal fluid, which flows from the tank 207 and is discharged from the circuit through the conduit 195. The pump 211 increases the pressure of the expandite mass in the conduit 202 to provide the expandite mass at the first combination of pressure and temperature.

Figure 11:
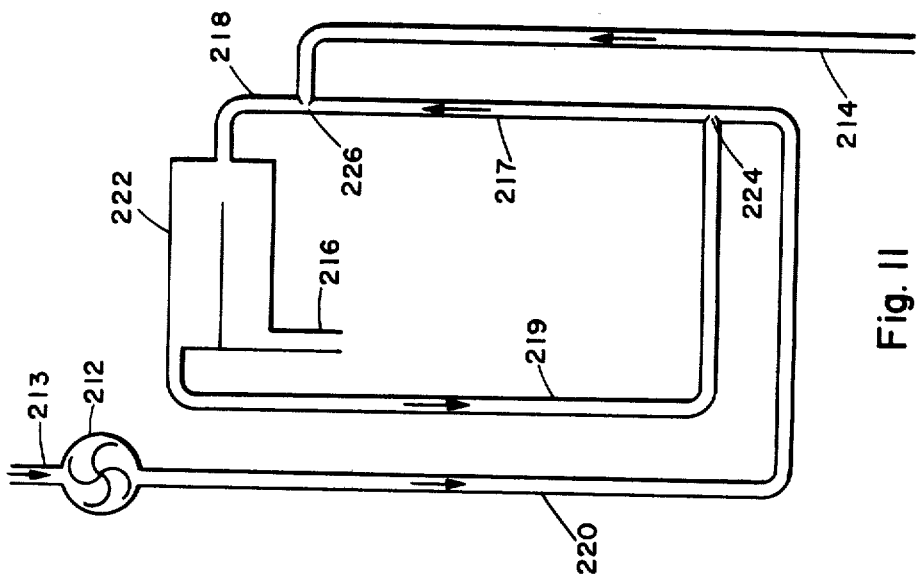
Figure 13:
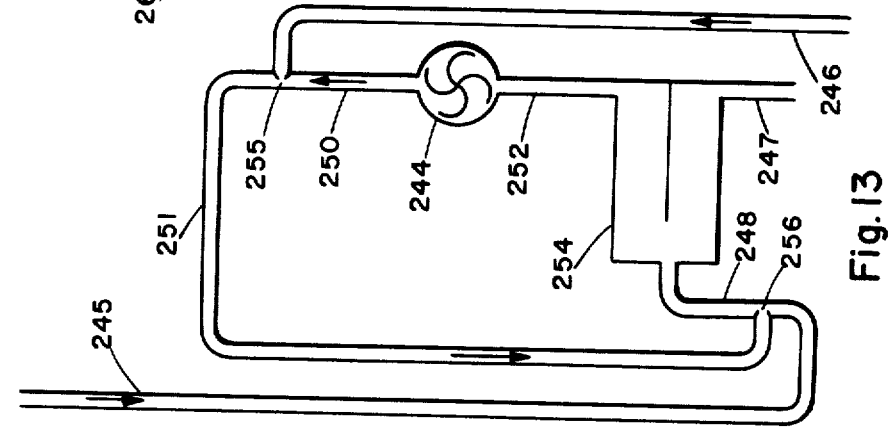
Figure 12:
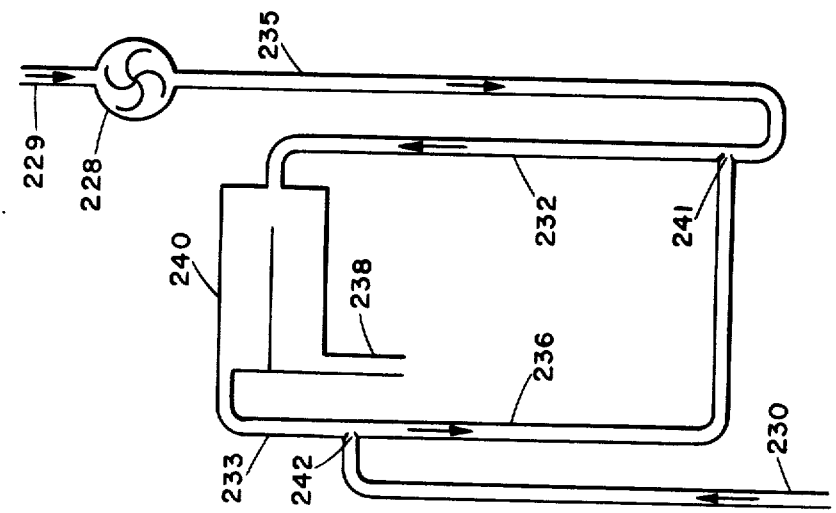

The embodiments of FIGS. 11, 12 and 13 are systems wherein fewer separation steps are employed. Although such embodiments may be somewhat less efficient than the other embodiments discussed herein, they do provide savings in construction costs.

The embodiment of FIG. 11 includes a turbine generator 212, and a mass transport conduit circuit including a warm water inlet conduit 213, a cold water inlet conduit 214; an outlet conduit 216, vertical conduits 217 and 218; conduits 219 and 220; a gravity separation tank 222 and injection nozzle system 224 and 226.

An expandite mass is provided in the conduit 219 at a first combination of pressure and temperature, and a first thermal fluid, such as warm ocean water is provided in the conduit 220 at a second combination of pressure and temperature. The first thermal fluid is introduced into the circuit through the inlet conduit 213 and diverted through the turbine generator, which converts the pressure of the fluid flow into electricity. The first thermal fluid flows from the turbine generator 212 through the conduit 220 at the second combination of pressure and temperature.

The expandite mass in the conduit 219 is injected through the nozzle system 224 into the vertical conduit 217 where it is combined with the first thermal fluid to create a first expandite-fluid mixture that flows vertically upward in the conduit 217 in response to the pressure differential created by the change in average proportional density of the first expandite-fluid mixture resulting from such combination. By directing the first expandite-fluid mixture vertically through the conduit 217, a pressure differential is created in the conduit section 217 in reation to the remainder of the conduit circuit for drawing the mixture upward through the conduit section 217.

A second thermal fluid, such as cold ocean water, is introduced into the circuit through the inlet conduit 214 at a third combination of pressure and temperature, and is injected through the nozzle system 226 into the vertical section of the conduit 218 where it is combined with the first expandite-fluid mixture to thermally condition (cool) the first expandite-fluid mixture. Such combination creates a secohd expandite-fluid mixture in the conduit 218.

The second expandite-fluid mixture in the conduit 218 is directed into the separation tank 222, where it is separated into the expandite mass, which flows from the tank 222 through the conduit 219 at the first combination of pressure and temperature, and a separated thermal fluid, which flows from the tank 222 and separated from the system through the conduit 216.

The embodiment of FIG. 12 includes a turbine generator 228, and a mass transport conduit circuit including a warm water inlet conduit 229, a cold water inlet conduit 230, vertical conduit sections 232 and 233, conduits 235 and 236, an outlet conduit 238, a gravity separation tank 240 and injection nozzle systems 241 and 242.

An expandite mass, such as a mixture of ethane and ocean water, is provided in the conduit 236 at a first combination of pressure and temperature. A first thermal fluid, such as warm ocean water, is introduced into the circuit through the inlet conduit 229 and directed through the turbine generator 228. The turbine generator 228 converts the pressure of the flow of the first thermal fluid into electricity and reduces the pressure of the flow to provide the first thermal fluid in the conduit 235 at a second combination of pressure and temperature.

The expandite mass in the conduit 236 is injected through the nozzle system 241 into the vertical conduit 232 were it is combined with the first thermal fluid to create a first expandite-fluid mixture that flows vertically upwards in the conduit 232 in response to the pressure differential created by the change in average proportional density of the first expandite-fluid mixture resulting from such combination. By directing the first expandite-fluid mixture vertically through the conduit 232, a pressure differential is created in the conduit section 232 in relation to the remainder of the conduit circuit for drawing the mixture upward through the vertical conduit section 232.

The first expandite-fluid mixture in the conduit 232 is directed into the separation tank 240, where it is separated into a separated expandite base, which flows from the tank 240 through the vertical conduit section 233, and a separated thermal fluid which flows from the tank 240 and is discharged from the circuit through the conduit 238. By directing the separated expandite base vertically through the conduit section 233, a pressure differential is created in relaton to the remainder of the conduit circuit for drawing the separated expandite base downward through the conduit section 233.

A second thermal fluid, such as cold ocean water, is introduced into the circuit through the inlet conduit 230 and is injection through the nozzle system 242 into the conduit 236, where it is combined with the separated expandite base (ethane) to thermally condition (cool) the ethane and create the expandite mass consisting of the mixture of ethane and ocean water at the first combination of pressure and temperature.

The embodiment of FIG. 13 includes a turbine generator 244 and a mass transport conduit circuit including a warm water inlet conduit 245; a cold water inlet conduit 246; an outlet conduit 247; conduit sections 248, 250, 251 and 252; a gravity separation tank 254 and injection nozzle systems 255 and 256.

An expandite mass, such as ethane, is provided in the conduit 250 at a first combination of pressure and temperature; and a first thermal fluid, such as cold ocean water, is introduced into the circuit through the inlet conduit 246 at a first combination of pressure and temperature. The first thermal fluid in the conduit 246 is injected through the nozzle system 255 into the conduit 251 where it is combined with the expandite mass from the conduit 250 to create a first expandite-fluid mixture that flows through the conduit 251 in the direction indicated by the arrows therein in response to the pressure differential created by the change in average proportional density of the first expandite-fluid mixture resulting from such combination.

A second thermal fluid, such as warm ocean water, is introduced into the circuit through the inlet conduit 245 at a third combination of pressure and temperature. The first expandite-fluid mixture in the conduit 251 is injected through the nozzle system 256 into the vertical conduit section 248, where it is combined with the second thermal fluid to thermally condition (heat) the first expandite-fluid mixture. Such combination creates a second expandite-fluid mixture in the conduit 248 that is directed vertically therein to create a pressure differential in the vertical conduit 248 in relation to the remainder of the circuit for drawing the second mixture upward through the conduit 248.

The second expandite-fluid mixture is directed into the separation tank 254, where it is separated into the expandite mass, which flows from the tank 254 through the conduit 252, and a separated thermal fluid, which flows from the tank 254 and is discharged from the system through the conduit 247.

The separated expandite base in the conduit 252 is directed through the turbine generator 244, which converts the pressure of the flow into electricity and provides the expandite mass in the vertical conduit 250 at the first combination of pressure and temperature. The separated expandite base is directed vertically through the conduit 250, and thereby creates a pressure differential therein in relation to the remainder of the circuit for drawing the separated expandite base vertically upward through the conduit 250.

Figure 14:
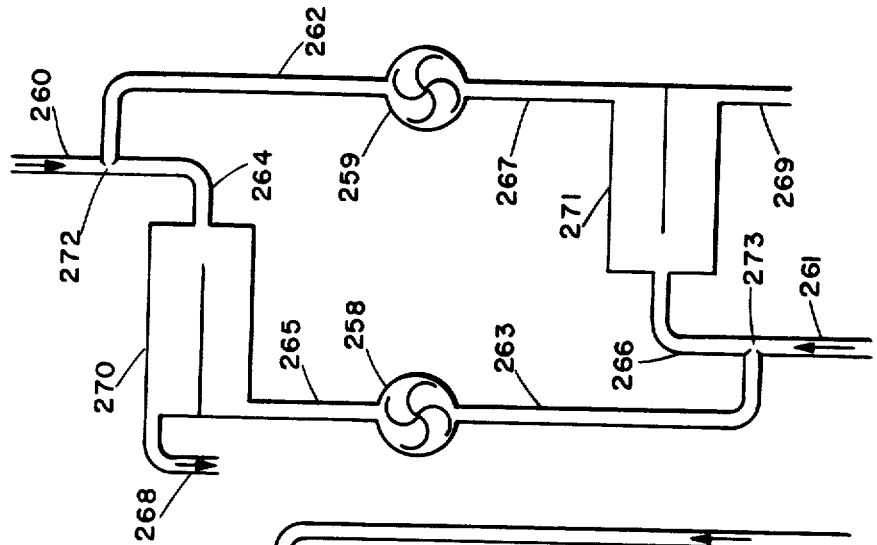

The embodiment of FIG. 14 includes two turbine generators 258 and 259, and a mass transport conduit circuit including a warm water inlet conduit 260; a cold water inlet conduit 261; vertical conduits 262 and 263; conduits 264, 265, 266 and 267; outlet conduits 268 and 269; gravity separation tanks 270 and 271 and injection nozzle systems 272 and 273.

An expandite mass, such as nitrobenzene, is provided in the conduit 262 at a first combination of pressure and temperature, and a first thermal fluid, such as warm ocean water is introduced into the circuit through the circuit 260 at a second combination of pressure and temperature. The first expandite mass is injected through the nozzle system 272 into the conduit 264, where it is combined with the first thermal fluid to create a first expandite-fluid mixture that flows downward through the conduit 264 in response to the pressure differential created by the change in average proportional density of the first expandite-fluid mixture resulting from such combination.

The first expandite-fluid mixture is directed into the separation tank 270, where it is separated into a separated expandite base, which flows from the tank 270 through the conduit 265, and a separated first thermal fluid, which flows from the tank 270 and is discharged from the system through the conduit 268.

The separated expandite base in the conduit 265 is directed through the turbine generator 258, which converts the pressure of the flow into electricity and provides the separated expandite base in the vertical conduit 263 at a reduced pressure. The separated expandite base is directed vertically through the conduit 263, and thereby creates a pressure differential therein in relation to the remainder if the circuit for drawing the separated expandite base vertically downward through the conduit 263.

A second thermal fluid, such as cold ocean water, is introduced into the circuit through the conduit 261 at a third combination of pressure and temperature. The separated expandite base in the conduit 263 is injected through the nozzle system into the conduit 266 where it is combined with the cold ocean water to thermally condition (cool) the separated expandite base, and to create a second expandite-fluid mixture that flows upward through the conduit 267 in response to the pressure differential created by the change in average proportional density of the second expandite-fluid mixture resulting from such combination.

The second expandite-fluid mixture in the conduit 266 is directed into the separation tank 271, where it is separated into the expandite mass, which flows from the tank 271 through the conduit 267, and a separated second thermal fluid, which flows from the tank 271 and is discharged from the circuit through the conduit 269.

The separated expandite mass in the conduit 267 is directed through the turbine generator 259, which converts the pressure of the flow into electricity and provides the expandite mass in the vertical conduit 262 at the first combination of pressure and temperature. The expandite mass is directed vertically through the conduit 262, and thereby creates a pressure differential therein in relation to the remainder of the circuit for drawing the expandite mass vertically upward through the conduit 262.

Each of the gravity separation tanks included in the various systems described hereinabove for separating an expandite-fluid mixture preferably includes a nucleation system (not shown) for creating films, bubbles and/or sprays of the expandite mixture to create more surface area of the expandite-fluid mixture for enabling the expandite to become free of the thermal fluid and to separate more readily from the mixture. Nucleation may be enhanced by shock waves or sonar vibrations.

Even after all of the series of separation steps have been completed some of the expandite mass typically remains dissolved in the separated thermal fluid that is discharged from the mass transport conduit circuit. It is important that the expandite mass material be non-polluting to the environment in which it is discharged. Also it should be inexpensive since it will have to be replenished within the circuit. However, these factors are of less concern in a system wherein the warm and cold thermal fluids are provided from reservoirs external to the circuit that are of a limited size, such as a lagoon or a solar collector. This is because the expandite mass that is dissolved in a thermal fluid will eventually constitute a certain percentage of the fluid in the reservoir and thereby remain in the system.

I claim:

1. A method of thermal energy conversion comprising the steps of:
   (a) providing a mass of unencased fluid expandites in a mass transport conduit circuit at a first combination of temperature and pressure;
   (b) introducing a non-gaseous thermal fluid into the mass transport conduit circuit from a source external to the mass transport conduit circuit at a second combination of temperature and pressure;
   (c) combining the provided expandite mass with the introduced thermal fluid in a given conduit of the circuit to create an expandite-fluid mixture having a density at some place in the given conduit that is changed from the average proportional density of the expandite mass and the thermal fluid at their respective prevailing combinations of temperature and pressure prior to such combination with each other to create a pressure differential that enhances the flow of the fluid contained within the circuit;
   (d) directing at least a portion of said fluids contained within the circuit to flow vertically through a given portion of the conduit circuit to create a pressure differential in the given portion of the circuit in relation to the remainder of the conduit circuit to thereby enhance the flow of said fluids contained within the conduit circuit; and
(e) converting the pressure of at least a part of said enhanced flow of said contained fluids through the conduit circuit into a useful form of energy;
wherein step (a) comprises the steps of:
(f) separating from the expandite-fluid mixture, an expandite base which comprises at least a portion of said expandite mass; and
(f') thermally conditioning said expandite base.

2. A method according to claim 1, wherein the expandite base is separated from the expandite fluid mixture while the expandite fluid mixture is in mixture with a second thermal fluid, characterized by step (a) further comprising the steps of:
(g) introducing a second thermal fluid into the mass transport conduit circuit from a source external to the mass transport conduit circuit at a third combination of temperature and pressure;
(h) combining the second thermal fluid with the expandite-fluid mixture to create a second expandite-fluid mixture; and by
step (f) comprising the step of:
(i) separating from the second expandite-fluid mixture, separated thermal fluid and the expandite base which comprises the expandite mass at said first combination of temperature and pressure.

3. A method according to claim 1, wherein the expandite mass consists of a mixture of a second thermal fluid and the expandite base,
characterized by step (f) comprising the step of:
(g) separating from the expandite fluid mixture, separated thermal fluid and the expandite base; and by
(step (a) further comprising the steps of:
(h) introducing a second thermal fluid into the mass transport conduit circuit from a source external to the mass transport conduit circuit at a third combination of temperature and pressures, and
(i) combining the separated expandite base with the introduced second thermal fluid to create the second mixture, which comprises the expandite mass at said first combination of temperature and pressure.

4. A method according to claims 2 or 3 characterized by step (e) comprising the step of:
(j) converting the flow of the second thermal fluid into a useful form of energy.

5. A method according to claims 2 or 3 characterized by step (e) comprising the step of:
(j) converting the flow of the separated thermal fluid into a useful form of energy.

6. A method according to claim 1 characterized by step (f) comprising the step of:
(g) separating from the expandite fluid mixture, a separated expandite base; and by
step (a) further comprising the step of:
(h) thermally conditioning the separated expandite base to provide at least said first mentioned expandite mass at said first combination of temperature and pressure.

7. A method according to claim 6, characterized by step (h) comprising the steps of:
(i) introducing a second thermal fluid into the mass transport conduit circuit from a source external to the mass transport conduit circuit at a third combination of temperature and pressure; and (j) combining the second thermal fluid with the separated expandite base to create a second expandite fluid mixtue; and
(k) separating from the second expandite-fluid mixture, a separated second thermal fluid and expandite mass which comprises at least said expandite mass at said first combination of temperature and pressure.

8. A method according to claim 7 characterized by step (j) comprising the step of:
(l) combining the second thermal fluid in a second conduit of the circuit with the separated expandite base to create a second expandite fluid mixture having a density at some place in the second conduit that is changed from the average proportional density of the separated expandite base and the second thermal fluid at their respective prevailing combinations of temperature and pressure prior to such combination with each other.

9. A method according to claims 2 or 7 characterized by step (d) comprising the step of:
(g) directing the second expandite-fluid mixture vertically through a portion of the mass transport conduit circuit, whereby a pressure differential is created in relation to the remainder of the circuit for drawing the second expandite fluid mixture through said portion.

10. A method according to claims 2 or 7 characterized by step (e) comprising the step of:
(l) converting the flow of the second expandite-fluid mixture into a useful form of energy.

11. A method according to claim 7 characterized by step (e) comprising the step of:
(l) converting the flow of the flow of the separated secondthermal fluid into a use form of energy.

12. A method according to claim 7 characterized by step (e) comprising the step of:
(l) converting the flow of the second thermal fluid into a useful form of energy.

13. A method according to claim 6, characterized by step (a) further comprising the steps of:
(i) providing a working fluid;
(j) combining the working fluid with the expandite mass to create an expandite-working fluid mixture;
(k) directing the expandite-working fluid mixture vertically through a portion of the mass transport conduit circuit, whereby a pressure differential is created in relation to the remainder of the circuit for drawing the expandite-working fluid mixture through said portion; by
step (i) comprising the step of:
(l) separating the working fluid from the expandite-working fluid mixture; and by
step (a) further comprising the step of:
(m) separating the expandite mass from the expandite-working fluid mixture.

14. A method according to claim 13, characterized by further comprising the step of:
(n) combining a portion of the separated expandite base with the expandite-working fluid mixture to increase said density change of the expandite-working fluid mixture.

15. A method according to claim 6 characterized by further comprising the steps of:
(i) providing a second portion of said expandite mass;
(j) thermally conditioning said second portion of expandite mass; and (k) combining the conditioned second portion of expandite mass with the expandite mass prior to step (c).

16. A method according to claim 6 characterized by further comprising the steps of:
    (i) providing a second portion of said expandite mass;
    (j) thermally conditioning said second portion of expandite mass; and
    (k) combining the conditioned second portion of expandite mass with the expandite fluid mixture.

17. A method according to claim 6 characterized by further comprising the steps of:
    (i) providing a second portion of said expandite mass;
    (j) thermally conditioning said second portion of expandite mass; and
    (k) combining the conditioned second portion of expandite mass with the therma fluid prior to step (c).

18. A method according to claim 6 characterized by: step (g) comprising the steps of:
    (i) separating from the expandite fluid mixture a first separated thermal fluid and a partially separated expandite mass; and
    (j) separating from the partially separated expandite mass a second separated thermal fluid and a separated expandite base; and by
    step (d) comprising the step of:
    (k) directing the partially separated expandite mass vertically through a portion of the mass transport conduit circuit, whereby a pressure differential is created in relation to the remainder of the circuit for drawing the partially separated expandite mass through said portion.

19. A method according to claim 6 characterized by step (e) comprising the step of:
    (i) converting the flow of the separated thermal fluid into a useful form of energy.

20. A method according to claim 1, wherein the expandite mass consists of a mixture of a working fluid and the expandite base, characterized by step (f) comprising the step of:
    (g) separating from the expandite fluid mixture; a separated thermal fluid, the working fluid, and the expandite base; and by
    step (a) further comprising the steps of:
    (h) thermally conditioning the expandite base; and
    (i) combining the thermally conditioned expandite base and the separated working fluid to provide said expandite mass at said first combination of temperature and pressure.

21. A method according to claim 20, wherein the working fluid consists of expandite base having a different density than the thermally conditioned expandite base; characterized by step (c) comprising the steps of:
    (j) separating from the expandite mass a high density component of the expandite mass and a low density component of the expandite mass;
    (k) combining the high density component of the expandite mass with the thermal fluid; and
    (l) separately combining the low density component of the expandite mass with the thermal fluid.

22. A method according to claim 21 characterized by step (e) comprising the step of:
    (m) converting the flow of the high density component and/or the low density component of the expandite mass into a useful form of energy.

23. A method according to claim 20 characterized by step (e) comprising the step of:
    (j) converting the flow of the working fluid into a useful form of energy.

24. A method according to claim 1 characterized by step (d) comprising the step of:
    (g) directing the expandite-fluid mixture vertically through a portion of the mass transport conduit circuit, whereby a pressure differential is created in relation to the remainder of the circuit for drawing the expandite-fluid mixture through said portion.

25. A method according to claim 1 characterized by step (d) comprising the step of:
    (g) directing the expandite mass vertically through a portion of the mass transport conduit circuit, whereby a pressure differential is created in relation to the remainder of the circuit for drawing the expandite mass through said portion.

26. A method according to claim 1 characterized by step (d) comprising the step of:
    (g) directing the expandite base vertically through a portion of the mass transport conduit circuit, whereby a pressure differential is created in relation to the remainder of the circuit for drawing the expandite base through said portion.

27. A method according to claim 1 characterized by step (e) comprising the step of:
    (g) converting the flow of the expandite mass into a useful form of energy.

28. A method according to claim 1 characterized by step (e) comprising the step of:
    (g) converting the flow of the thermal fluid into a useful form of energy.

29. A method according to claim 7 characterized by step (e) comprising the step of:
    (g) converting the flow of the expandite mass into a useful form of energy; and by
    each of the separation steps comprising a gravity separation process that is carried out at an elevation where the ambient pressure is approximately the same as the pressure of the mixture being separated.

30. A method according to claim 7 characterized by step (e) comprising the step of:
    (g) converting the flow of the thermal fluid into a useful form of energy; and by
    each of the separation steps comprising a gravity separation process that is carried out at an elevation where the ambient pressure is approximately the same as the pressure of the mixture being separated.

31. A method according to claim 1 characterized by step (e) comprising the step of:
    (g) converting the flow of the expandite-fluid mixture into a useful form of energy.

32. A method according to claim 1, characterized by step (e) comprising the step of:
    (g) converting the flow of the expandite base into a useful form of energy.

33. A method according to claim 1, characterized by said combination of step (c) being non-reactive chemically whereby the chemical composition of the expandite mass and the thermal fluid remain unchanged by said combination.

34. A method according to claim 1, characterized by further comprising the step of:
    (g) thermally conditioning the expandite fluid mixture; and by
    step (f) comprising the step of:

(h) separating from the thermally conditioned expandite-fluid mixture a separated thermal fluid and a separated expandite base to provide at least said first mentioned expandite mass at said first combination of temperature and pressure.

35. A method according to claims 1, 2, 3, 7, 13 or 21, wherein at least one of said separating steps comprises a gravity separation process.

36. A method according to claim 35, wherein at least one of said gravity separation processes includes creating films, bubbles, and/or sprays of the mixture to create more surface area of the mixture for enabling the expandite to become free of the thermal fluid and to separate more readily from the mixture.

37. A method according to claim 35, wherein at least one of said gravity separation processes is carried out at an elevation where the ambient pressure is approximately the same as the pressure of the mixture.

38. A method according to claim 35, wherein the gravity separation process comprises passing the expandite-fluid mixture through a series of gravity separators to provide successively lower pressures for enabling separation from the mixture at said lower pressures, of expandite that was not separated at said higher pressures.

39. A thermal conversion system comprising
a mass of unencased fluid expandites;
a mass transport conduit circuit, including
    means for introducing a non-gaseous thermal fluid into the mass transport conduit circuit from a source external to the mass transport conduit circuit;
    means for combining the expandite mass at a first combination of temperature and pressure with the introduced thermal fluid at a second combination of temperature and pressure in a given conduit of the circuit to create an expandite-fluid mixture having a density at some place in the given conduit that is changed from the average proportional density of the expandite mass and the thermal fluid at their respective prevailing combinations of temperature and pressure prior to such combination with each other to create a pressure differential that enhances the flow of fluid contained within the circuit;
    means for directing at least a portion of said fluids contained within the circuit to flow vertically through a given portion of the conduit circuit to create a pressure differential in the given portion of the circuit in relation to the remainder of the conduit circuit to thereby enhance the flow of said fluids contained within the conduit circuit; and
a transducer for converting the pressure of at least a part of said enhanced flow of said contained fluids through the conduit circuit into a useful form of energy;
wherein the mass transport conduit circuit comprises
means for separating from the expandite-fluid mixture, an expandite base which comprises at least a portion of said expandite mass; and
means for thermally conditioning said expandite base.

40. A system according to claim 39, wherein the circuit includes means for separating the expandite base from the expandite fluid mixture while the expandite fluid mixture is in mixture with a second thermal fluid, characterized by the circuit further comprising
    means for introducing a second thermal fluid into the mass transport conduit circuit from a source external to the mass transport conduit circuit at a third combination of temperature and pressure; and
    means for combining the second thermal fluid with the expandite-fluid mixture to create a second expandite-fluid mixture; and by
the first recited separating means comprising
    means for separating from the second expandite-fluid mixture, separated thermal fluid and the expandite base which comprises the expandite mass at said first combination of temperature and pressure.

41. A system according to claim 39, wherein the expandite mass consists of a mixture of a second thermal fluid and the expandite base,
characterized by the separating means comprising
    means for separating from the expandite-fluid mixture, separated thermal fluid and the expandite base; and by
the circuit comprising
    means for introducing a second thermal fluid into the mass transport conduit circuit from a source external to the mass transport conduit circuit at a third combination of temperature and pressure, and
    means for combining the separated expandite base with the introduced second thermal fluid to create the second mixture, which comprises the expandite mass at said first combination of temperature and pressure.

42. A system according to claims 40 or 41 characterized by the transducer comprising
    means for converting the flow of the second thermal fluid into a useful form of energy.

43. A system according to claims 40 or 41 characterized by the transducer comprising
    means for converting the flow of the separated thermal fluid into a useful form of energy.

44. A system according to claim 39, characterized by the separating means comprising
    means for separating from the expandite fluid mixture, a separated expandite base; and by
the circuit further comprising
    means for thermally conditioning the separated expandite base to provide at least said first mentioned expandite mass at said first combination of temperature and pressure.

45. A system according to claim 44, characterized by the thermal conditioning means comprising
    means for introducing a second thermal fluid into the mass transport conduit circuit from a source external to the mass transport conduit circuit at a third combination of temperature and pressure; and
    means for combining the second thermal fluid with the separated expandite base to create a second expandite-fluid mixture, and
    means for separating from the second expandite-fluid mixture, a separated second thermal fluid and expandite mass which comprises at least said expandite mass at said first combination of temperature and pressure.

46. A system according to claim 45, characterized by the means for combining the second thermal fluid with the separated expandite base comprising
    means for combining the second thermal fluid in a second conduit of the circuit with the separated expandite base to create a second expandite fluid mixture having a density at some place in the second conduit that is changed from the average proportional density of the separated expandite base and the second thermal fluid at their respective prevailing combinations of temperature and pressure prior to such combination with each other.

47. A system according to claims 40 or 45 characterized by the directing means comprising means for directing the second expandite-fluid mixture vertically through a portion of the mass transport conduit circuit, whereby a pressure differential is created in relation to the remainder of the circuit for drawing the second expandite-fluid mixture through said portion.

48. A system according to claims 40 or 45 characterized by the transducer comprising means for converting the flow of the second expandite-fluid mixture into a useful form of energy.

49. A system according to claim 45, characterized by the transducer comprising means for converting the flow of the separated second thermal fluid into a useful form of energy.

50. A system according to claim 45 characterized by the transducer comprising means for converting the flow of the second thermal fluid into a useful form of energy.

51. A system according to claim 44, characterized by further comprising a working fluid; and by the circuit further comprising means for combining the working fluid with the expandite mass to create an expandite-working fluid mixture; and means for directing the expandite-working fluid mixture vertically through a portion of the mass transport conduit circuit, whereby a pressure differential is created in relation to the remainder of the circuit for drawing the expandite-working fluid mixture through said portion;

means for separating the working fluid from the expandite-working fluid mixture; and means for separating the expandite mass from the expandite-working fluid mixture to provide the working fluid.

52. A system according to claim 51, characterized by the circuit further comprising means for combining a portion of the separated expandite base with the expandite-working fluid mixture to increase said density change of the expandite-working fluid mixture.

53. A system according to claim 44, characterized by the circuit further comprising means for providing a second portion of said expandite mass;

means for thermally conditioning said second portion of expandite mass; and means for combining the conditioned second portion of expandite mass with the expandite mass prior to combining the expandite mass with the introduced thermal fluid.

54. A system according to claim 44, characterized by the circuit further comprising means for providing a second portion of said expandite mass;

means for thermally conditioning said second portion of expandite mass; and means for combining the conditioned second portion of expandite mass with the expandite fluid mixture.

55. A system according to claim 44, characterized by the circuit further comprising means for providing a second portion of said expandite mass;

means for thermally conditioning said second portion of expandite mass; and means for combining the conditioned second portion of expandite mass with the thermal fluid prior to combining the expandite mass with the introduced thermal fluid.

56. A system according to claim 44, characterized by the means for separating the separated expandite base from the expandite-fluid mixture comprising means for separating from the expandite fluid mixture a first separated thermal fluid and a partially separated expandite mass; and means for separating from the partially separated expandite mass a second separated thermal fluid and a separated expandite base; and by the directing means comprising means for directing the partially separated expandite mass vertically through a portion of the mass transport conduit circuit, whereby a pressure differential is created in relation to the remainder of the circuit for drawing the partially separated expandite mass through said portion.

57. A system according to claim 44 characterized by the transducer comprising means for converting the flow of the separated thermal fluid into a useful form of energy.

58. A system according to claim 39, wherein the expandite mass consists of a mixture of a working fluid and the expandite base, characterized by the separating means comprising means for separating from the expandite-fluid mixture; a separated thermal fluid, the working fluid, and the expandite base; and by the circuit further comprising means for thermally conditioning the expandite base; and means for combining the thermally conditioned expandite base and the separated working fluid to provide said expandite mass at said first combination of temperature and pressure.

59. A system according to claim 58, wherein the working fluid consists of expandite base having a different density than the thermally conditioned expandite base; characterized by the first recited combining means comprising means for separating from the expandite mass a high density component of the expandite mass and a low density component of the expandite mass;

means for combining the high density component of the expandite mass with the thermal fluid; and means for separately combining the low density component of the expandite mass with the thermal fluid.

60. A system according to claim 59, characterized by the transducer comprising means for converting the flow of the high density component and/or the low density component of the expandite mass into a useful form of energy.

61. A system according to claim 58, characterized by the transducer comprising means for converting the flow of the working fluid into a useful form of energy.

62. A system according to claim 39 characterized by the directing means comprising means for directing the expandite-fluid mixture vertically through a portion of the mass transport conduit circuit, whereby a pressure differential is created in relation to the remainder of the circuit for drawing the expandite-fluid mixture through said portion.

63. A system according to claim 39 characterized by the directing means comprising
means for directing the expandite mass vertically through a portion of the mass transport conduit circuit, whereby a pressure differential is created in relation to the remainder of the circuit for drawing the expandite mass through said portion.

64. A system according to claim 39, characterized by the directing means comprising
means for directing the expandite base vertically through a portion of the mass transport conduit circuit, whereby a pressure differential is created in relation to the remainder of the circuit for drawing the expandite base through said portion.

65. A system according to claim 39, characterized by the transducer comprising
means for converting the flow of the expandite mass into a useful form of energy.

66. A system according to claim 39 characterized by the transducer comprising
means for converting the flow of the thermal fluid into a useful form of energy.

67. A system according to claim 45, characterized by the transducer comprising
means for converting the flow of the expandite mass into a useful form of energy; and by
each of the separation means comprises means for carrying out a gravity separation process at an elevation where the ambient pressure is approximately the same as the pressure of the mixture being separated.

68. A system according to claim 45, characterized by the transducer comprising
means for converting the flow of the thermal fluid into a useful form of energy; and by
each of the separation means comprises means for carrying out a gravity separation process at an elevation where the ambient pressure is approximately the same as the pressure of the mixture being separated.

69. A system according to claim 39, characterized by the transducer
means for converting the flow of the expandite-fluid mixture into a useful form of energy.

70. A system according to claim 39, characterized by the transducer comprising
means for converting the flow of the expandite base into a useful form of energy.

71. A system according to claim 39, characterized by the expandite mass and the introduced thermal fluid being non-reactive chemically whereby the chemical composition of the expandite mass and the thermal fluid remain unchanged by said combination.

72. The system according to claim 39, characterized by the circuit further comprising
means for thermally conditioning the expandite fluid mixture; and by
the separating means comprising
means for separating from the thermally conditioned expandite-fluid mixture a separated thermal fluid and a separated expandite base to provide at least said first mentioned expandite mass at said first combination of temperature and pressure.

73. A system according to claims 39, 40, 41, 45, 51 or 59, wherein at least one of said separating means comprises a gravity separation system.

74. A system according to claim 73, where at least one of the said gravity separation systems includes means for creating films, bubbles, and/or sprays of the mixture to create more surface area of the mixture for enabling the expandite to become free of the thermal fluid and to separate more readily from the mixture.

75. A system according to claim 73, wherein at least one of said gravity separation systems is positioned at an elevation where the ambient pressure approximately the same as the pressure of the mixture.

76. A system according to claim 73, wherein the gravity separation system comprises a series of gravity separators to provide successively lower pressures for enabling separation from the mixture at said lower pressures, of expandite that was not separated at said higher pressures.

* * * * *